United States Patent
John et al.

(10) Patent No.: US 9,747,560 B2
(45) Date of Patent: Aug. 29, 2017

(54) METHOD AND SYSTEM FOR COMBINATION OF INDEPENDENT DEMAND DATA STREAMS

(75) Inventors: Thomas John, Weinheim (DE);
Konrad Traeger, Dossenheim (DE);
Newsha Eftekhari, Mannheim (DE)

(73) Assignee: SAP SE, Walldorf (DE)

( * ) Notice: Subject to any disclaimer, the term of this patent is extended or adjusted under 35 U.S.C. 154(b) by 2871 days.

(21) Appl. No.: 11/181,653

(22) Filed: Jul. 13, 2005

(65) Prior Publication Data
US 2007/0016467 A1    Jan. 18, 2007

(51) Int. Cl.
*G06Q 10/00*    (2012.01)
*G06Q 10/06*    (2012.01)
*G06Q 30/02*    (2012.01)

(52) U.S. Cl.
CPC ......... *G06Q 10/06* (2013.01); *G06Q 30/0202* (2013.01)

(58) Field of Classification Search
CPC .............................. G06Q 10/00; G06Q 30/02
USPC ...................... 705/7–10, 7.11–7.42
See application file for complete search history.

(56) References Cited

U.S. PATENT DOCUMENTS

| | | | |
|---|---|---|---|
| 6,611,726 B1 * | 8/2003 | Crosswhite | G06F 17/18 700/100 |
| 7,080,026 B2 | 7/2006 | Singh et al. | |
| 7,092,896 B2 | 8/2006 | Delurgio et al. | |
| 7,480,623 B1 | 1/2009 | Landvater | |
| 2002/0143598 A1 * | 10/2002 | Scheer | 705/9 |
| 2002/0169657 A1 * | 11/2002 | Singh et al. | 705/10 |
| 2004/0230470 A1 | 11/2004 | Svilar et al. | |
| 2005/0065838 A1 * | 3/2005 | Kalagnanm | G06Q 10/0637 705/7.31 |
| 2005/0288993 A1 * | 12/2005 | Weng | G06Q 30/0202 705/7.31 |

OTHER PUBLICATIONS

"Collaborative Planning, Forecasting and Replenishment (CPFR)," Version 2.0, Global Commerce Initiative Recommended Guidelines, Jun. 2002, 154 pgs.
"Creation of Promotions," SAP Advanced Planner and Optimizer (SAP APO), Release 3.0A, Nov. 2000, http://help.sap.com/saphelp_apo/helpdata/en/od/429ba838ee11d3982b0000e8a49608/content.htm, 2 pgs.
"Demand Planning," SAP Advanced Planner and Optimizer (SAP APO), Release 3.0A, Nov. 2000, http://help.sap.com/saphelp_apo/helpdata/en/8a/9d6937089c2556e10000009b38f889/content.htm, 2 pgs.
"Functions in Detail—SAP Advanced Planner & Optimizer," SAP, Demand Planning, Dec. 1999, 20 pgs.
"Promotion," SAP Advanced Planner and Optimizer (SAP APO), Release 3.0A, Nov. 2000, http://help.sap.com/saphelp_apo/helpdata/en/d8/d483213aad11d3982b0000e8a49608/content.htm, 1 pg.

(Continued)

*Primary Examiner* — David Rines

(57) ABSTRACT

A system and method of combining independent demand forecast streams. Demand data is extracted from each of the demand forecast streams. The extracted data is combined based on one or more criteria to yield a single resultant demand data set. The resultant demand data set is released for supply network planning rather than any original forecast data stream.

19 Claims, 7 Drawing Sheets

(56) References Cited

OTHER PUBLICATIONS

"SAP Advanced Planning and Optimization 4.0 (SAP APO 4.0)," SAP, 2003, 20 pgs.
"SAP Consumer Products—From Demand Planning to Vendor Management Inventory with SAP APO," SAP, 1999, 8 pgs.
"SAP Trade Promotion Management," SAP, Apr. 2002, 3 pgs.
"SAP Trade Promotion Management: Closed-Loop, Fully Integrated, Delivered with mySAP CRM," ZDNet.co.uk, Nov. 14, 2003, 5 pgs.
"SAP Unveils new Enhancements to Solution for Retailers; Expanded Core Merchandising with my SAP Retail Delivers Improved Planning, Allocation, and inventory Management," Business Editors/High-Tech & Retail Writers Retail Systems, 2002, Conference & Exhibition, Business Wire, New York: Jun. 25, 2002, 3 pgs.
Bansal, Sam, "Theory and Practice of Advanced Planner and Optimizer in Supply Chain Domain," International Management Consultant & CIP, La Jolla, CA, Proceedings of the 2003 Winter Simulation Conference, 2003, 9 pgs.
Gilding, D.B., et al., "Determination of Stock for Sales Promotions," The Journal of the Operational Research Society, vol. 31, No. 4 (Apr. 1980), 311-318.
Knolmayer, G, et al., "Supply Chain Management Based on SAP Systems—Order Management in Manufacturing Companies," Springer, 2002, ISBN 3-540-66952-3, 256 pgs.
Leonard, Michael, "Promotional Analysis and Forecasting for Demand Planning: A Practical Time Series Approach," SAS Institute, Inc., Cary, NC, USA, 2001, 16 pgs.
Martin, Andre, "Distribution Resource Planning," Revised Edition, John Wiley & Sons, 1995, ISBN 0-471-13222-5, 57 pgs.
Quintana, Rolando, et al., "Preliminary Analysis of an Adaptive Smoothing Factor for Lumpy Demand Forecasting," PICMET'01, 2001, University of Texas at El Paso, Mechanical and Industrial Engineering Department Logistics and Simulation Laboratory, 1 pg.

* cited by examiner

FIG. 2A

| Node | Conditions | | | Horizon | Cum Hoz | True | False | Activity |
|---|---|---|---|---|---|---|---|---|
| 1 | RR Promo | > | Zero | 2 P | 1 | 2 | 7 | |
| 2 | DP Promo | > | Zero | 2 P | 1 | 3 | 4 | |
| 3 | Days of cov. | > | 2 | 2 P | 1 | 5 | 6 | |
| 5 | | | | | | | | Early promotion |

Condition Operator:

1. Greater than
2. Less than
3. Greater than or equal to
4. Less than or equal to
5. Not equal to
6. Cumulative
7. AND
8. OR
...

| Activity Early Promotion | |
|---|---|
| Source Key figure | RR DP |
| Result Activity | Take early promotion |
| Parameters | Threshold |

Binary tree

US 9,747,560 B2

METHOD AND SYSTEM FOR COMBINATION OF INDEPENDENT DEMAND DATA STREAMS

BACKGROUND OF THE INVENTION

Field

Embodiments of the invention relate to improving demand forecasts. More specifically, embodiments of the invention relate to combining data from independent demand forecasts to improve demand forecasting.

Background

Demand forecasting has long been an integral part of supply chain management. Advanced planner and optimizer (APO) software available form SAP AG of Walldorf, Germany includes a demand planning module, which provides a demand forecast data stream that may be used in supply network planning (SNP). The demand planning module uses statistical forecasting techniques and other methods for demand forecasting. The demand planning module may generate a forecast of products sold and generate a sales plan of the scenario, which serves as a starting point for subsequent planning activities. The demand plan is commonly based on historical data, which may be available directly from enterprise resource planning (ERP) systems or some other archival system. The demand planning module may use various common forecasting methods such as, smooth average values, trend models, multiple linear regression analysis, etc. Typically, the demand planning module provides relatively low granularity using time intervals of one week or possibly an interval of a month or longer in creating its demand plan. The demand plan is then released to the supply network planning module of the APO, which uses the demand plan to determine production procurement and distribution schedules at a tactical level.

With the expansion of vendor management inventory (VMI), responsive replenishment (RR) systems provide order forecasts typically based on a daily time interval. RR often provides a very accurate short-term outlook with accuracy deteriorating with increase time into the future. Use of the demand planning data stream often yields significant demand inaccuracies in the demand forecast due in part to its low granularity. However, replacing demand planning forecasts with the responsive replenishment forecast also tends to yield an inaccurate ultimate demand forecast.

SUMMARY OF THE INVENTION

A system and method of combining independent demand forecast streams is described. Demand data is extracted from each of the demand forecast streams. The extracted data is combined based on one or more criteria to yield a single resultant demand data set. The resultant demand data set is released for supply network planning rather than any original forecast data stream.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 2A is a table showing an example of comparison of current data with most recently received data for RR.

DETAILED DESCRIPTION

Figure 1:
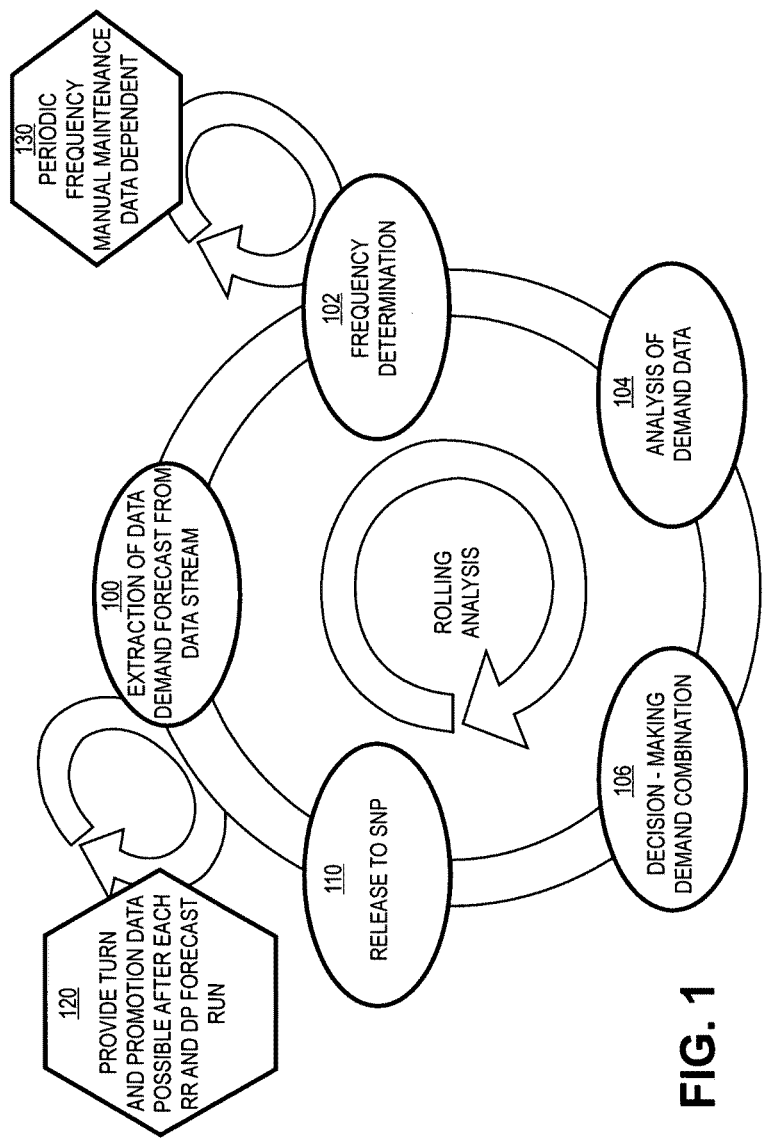
FIG. 1 is a schematic diagram of rolling analysis for demand combination in accordance with one embodiment of the invention.

FIG. 1 is a schematic diagram of rolling analysis for demand combination in accordance with one embodiment of the invention. Turn and promotion data 120 may become available after each responsive replenishment (RR) run and after each demand planning (DP) forecast run. As used herein, "promotion" refers to sales activity to increase short-term sales often through price reduction or increased quantity, such as two for the price of one offers. In this description, "turn" and "baseline" are used interchangeably to refer to the sales when no promotion is occurring or that would have occurred even without the promotion. The RR and DP runs will likely occur at different time intervals. Thus, any particular RR run may or may not coincide with a DP forecast run. At 100, turn promotion data is extracted from the RR stream and/or the DP stream as appropriate. This extraction need not be synchronous rather, extraction 100 may be performed whenever new data becomes available.

At 102, a determination is made regarding the frequency of analysis and demand combination for the incoming data streams. In one embodiment, the frequency of demand combination is established as a single periodic value for all characteristic combinations, e.g., weekly, monthly, etc. Such periodic updates may be done in a batch mode. In one embodiment, this periodic frequency may be overridden on a characteristic combination basis when the extracted data is different by more than a threshold from previously extracted forecast data. For example, one characteristic combination may be customer, location and product. In such case, a demand combination run is triggered even if a prior run analysis occurred more recently than the periodic frequency would dictate.

In an alternative embodiment, frequency may be established on a characteristic combination basis. Thus, in some embodiments, the frequency that a demand stream for a characteristic combination should be analysed and possibly combined may be independent of the frequency of demand combination for other characteristic combinations. In one embodiment, frequency of combination may be established as a periodic value based on such factors as volume, variability, and value. In one embodiment, this frequency may be established for the characteristic combination using ABC analysis. In addition to the periodic frequency, in one embodiment, an analysis and demand combination run may be forced manually. Thus, in various embodiments, the basis 130 for the frequency determination may be established periodic frequency, manual intervention or data dependent.

At 104, assuming desired periodicity is reached, manual intervention or threshold data change, the extracted demand data is analysed. This analysis may include generation of error statistics, such as absolute percentage error (APE) or weighted absolute percentage error (WAPE). Also during analysis, the time relationship between the data streams may be normalized. For example, in one embodiment, DP forecast are run on a weekly basis while RR runs at daily time intervals. In such an embodiment, seven (7) days of RR can be aggregated to correspond to a week of DP. Alternatively, in one embodiment of the invention, DP values are converted to daily time intervals to correspond to the same time interval as the RR values. This may be performed as a straight division by the number of days or using a complex algorithm to distribute, e.g., the weeks data planning forecast to the corresponding days of the week. Such algorithm may be linear or non-linear and may be based on historical empirical data.

With the normalized time intervals and the appropriate calculation of error statistics, decision making for appropriate demand combination can occur at 106. As described below, there are many possible rules and manners in which the data from the two streams may be combined. This may include straight selection of the value from one or the other stream based on various criteria including, for example, the error statistics previously calculated, or may include applying a weighting factor to the value from each demand stream and summing the value to find a single value for each relevant time interval to release to SNP at 110. While the data extraction is described as occurring from two data streams, RR and DP, it is within the scope and contemplation of embodiments of the invention for data to be extracted (and subsequently combined) from N independent stream, where N is an arbitrarily large number.

Figure 2:
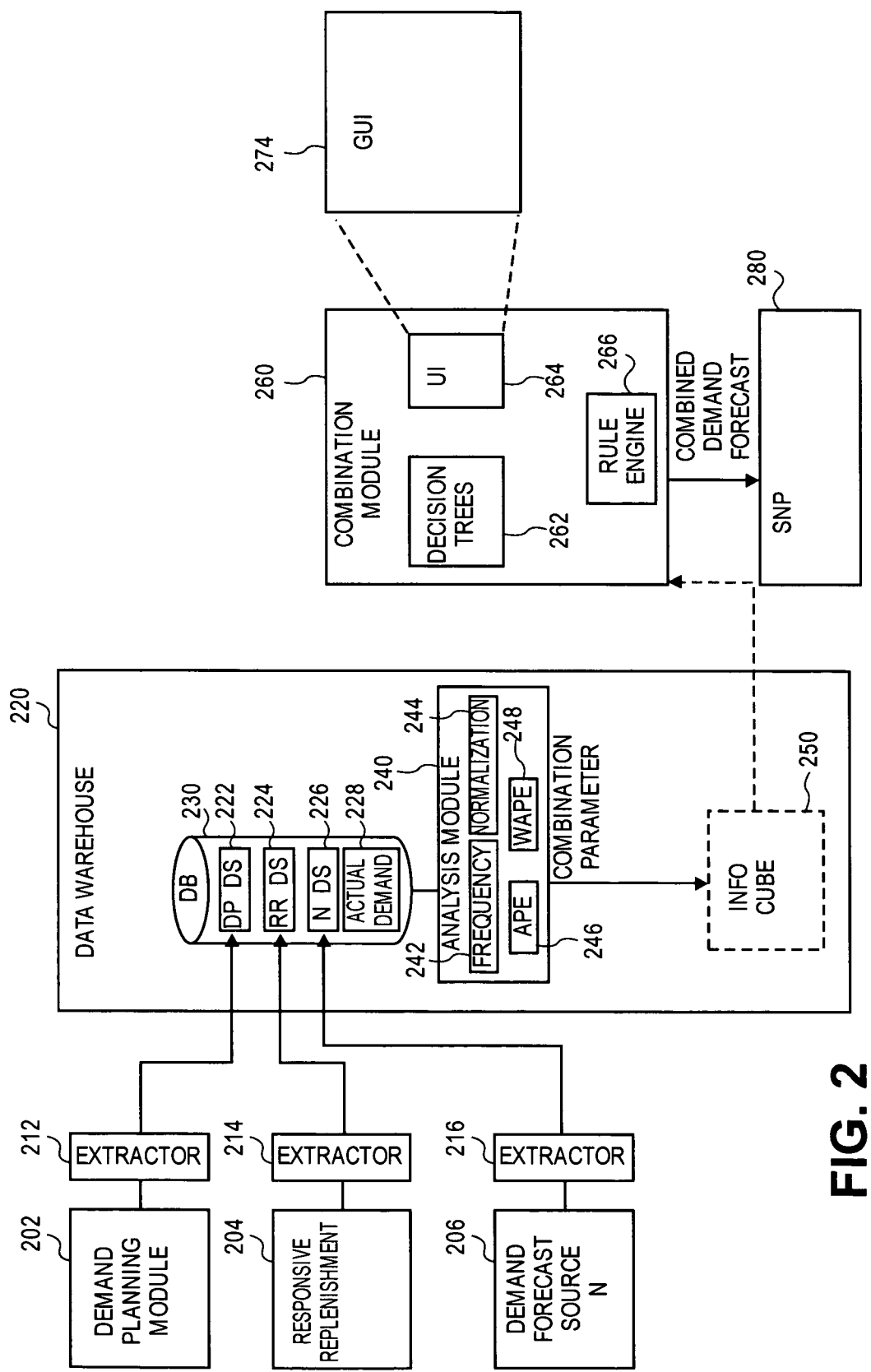
FIG. 2 is a block diagram of a system of one embodiment of the invention.

FIG. 2 is a block diagram of a system of one embodiment of the invention. DP module 202 may perform a periodic forecasting run which creates a time series data stream of forecast data for each characteristic combination corresponding to future time intervals of a defined value, e.g., a day, a week, a month, etc. Extractor 212 takes the data 222 from this data stream and stores it in a database 230 of data warehouse 220. In one embodiment, data warehouse 220 may be Business Information Warehouse (BW) available from SAP AG of Waldorf, Germany. In one embodiment, extractor 212 extracts the data based on characteristics, such as planning number, product number, ship from location number and customer group. In one embodiment, extraction occurs for weekly time intervals. Extracted data 222 may include both baseline forecast figures and promotional forecast figures. In various embodiments, all or only a subset of the data from the data's stream may be extracted. In some embodiments, the extractor 212 extracts only a defined field set from the demand forecast stream.

Similarly, RR module 204, which may be part of a vendor managed inventory (VMI) system, performs periodic replenishment runs. RR may occur at defined time intervals, such as an hour, six hours, a day, a week, etc. Extraction 214 extracts the data from the corresponding data stream and stores it as extracted data 224 in database 230. Again, extracted data 224 may include both baseline and promotion data. In one embodiment, extracted data 224 may also include surplus inventory. Surplus inventory may provide guidance regarding why an RR forecast is unexpectedly low.

In one embodiment, the source of the demand data in RR are existing replenishment orders and transport load builder (TLB) orders for a selection of parameters, such as planning version, ship from location, ship to location, Universal Product Code (UPC) and ship from date. To facilitate normalization to a common time interval, all ship from dates corresponding to the desired common time interval should be extracted. For example, if the time interval is one week, all ship from dates falling in that seven day interval should be extracted. As with DP, RR extraction may be limited to a defined set of fields. In one embodiment, distribution requirements planning (DRP) and TLB order quantities are extracted for daily intervals and on a characteristic combination basis. Quantities are typically extracted in the base unit of measure. Some embodiments use a flag, for example, a product status code to limit extraction to active products. This helps to reduce the size of data set processed during subsequent demand combination.

An additional data stream, such as demand forecast source N 206 may have data extracted by an extractor 216. Extracted data is similarly stored in database 230 as extracted data 226. Database 230 also includes actual demand data 228, which may be obtained from an enterprise resource planning (ERP) module (not shown) at some point prior or concurrently with the extraction of the forecast demand data from one of the demand data streams. In one embodiment, actual sales data may be extracted from delivery item data based on product number, ship from location number and customer group. The actual goods issue date may be used to assign actual demand to a time interval. The data desired for subsequent use includes shipment quantity and base unit of measure.

In one embodiment, also stored within database 230 is extracted data from the most recent previous extraction from the corresponding data stream. This data is used by a frequency component 242 of analysis module 240 for comparison with the current extracted data, e.g., 222, 224 to discern if a demand combination run should occur prior to the next scheduled periodic run. In some embodiments, analysis module 240 may include a normalization component 244 to convert the different time intervals of the various demand streams to a common time interval.

Figure 2A:
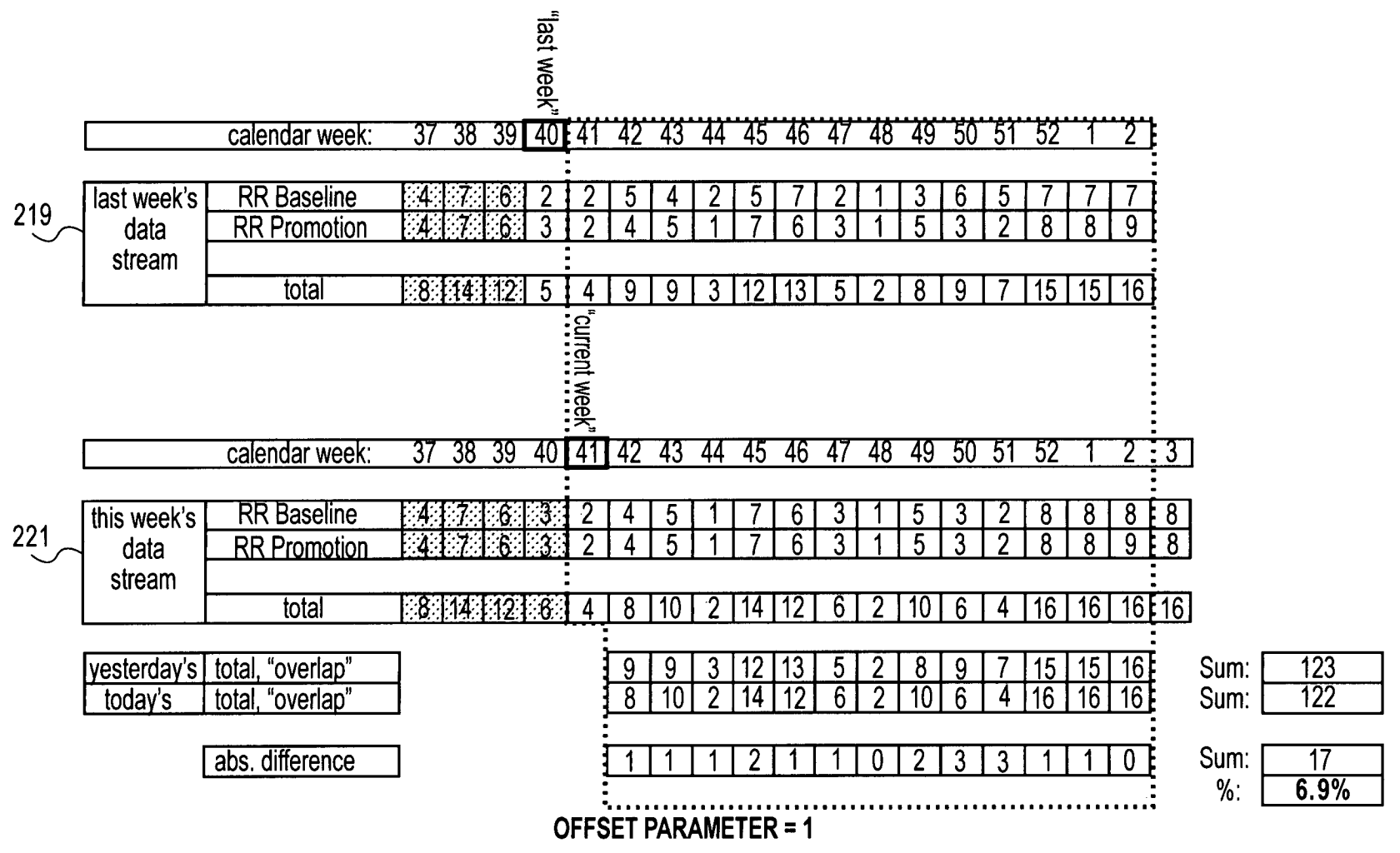

FIG. 2A is a table showing an example of comparison of current data with most recent previously received data for RR. Each data stream includes a baseline and a promotion key figure. In this example, the most recent previous data 219 was received yesterday (assumed to be the last day of the past week) and the current data 221 was received today (assumed to be the first day of the current week).

Each corresponding pair of weekly intervals of baseline and promotions are summed to total key figures for each set of data. Only the overlapping parts of the two key figures are considered in the comparison, which means in this example that the interval for calendar week three is not considered since it is only part of the second data set. A parameter specifies the number of intervals starting from the current week that are not considered in the comparison. This offset parameter is maintained as global parameter in the data warehouse customizing. In our example, the offset parameter is one so the first interval (the current week) is not considered in the comparison. For each total key figure all intervals that are within the so defined overlap are summed. In this example, the resulting totals are 122 and 123. Then for each of the corresponding pairs of totals key figure intervals, the absolute difference is calculated and summed up. In this example, this sum is 17. The relative deviation of the two data streams is calculated to 17/122+123 or 6.9% difference.

This value is now compared to a threshold that is maintained as global parameter in the data warehouse customizing. The flag to trigger demand combination is set for a characteristic combination if the deviation for least one of the data streams is greater than or equal to the threshold value. In this example, if the threshold was 5%, this RR comparison would trigger a combination run. If on the other hand the threshold was 10%, no combination run would be triggered.

In some embodiments, analysis module may include error calculation components, such as APE component 246 to calculate APE and WAPE component 248 to calculate WAPE. In one embodiment, the APE calculation for a specific data source like DP or RR is performed in a data warehouse update rule using the following algorithm:

$$APE(k,m)=|Act(k)-FC(k,m)|/Act(k)*100$$

Where k indicates the calendar week interval;

m indicates the date point (week in which the forecast was calculated);

FC indicates the forecast quantity (of a specific data source like DP or RR); and Act indicates the actual sales quantity (shipment data).

Additional rules are applied to consider zeros in forecast and shipments:

If forecast quantity>0 and actual sales quantity=0, APE will be set to 0%. If forecast quantity>0 and actual sales quantity<0 (i.e. returns), APE will be set to 0%. If forecast quantity=0 and actual sales quantity>0, APE will be set to 100%

In one embodiment, the WAPE calculation for a specific data source like DP or RR is performed in a data warehouse update rule according to:

$$WAPE(t,s,n) = \sum_{i=t-n}^{t-1}(APE(i,i-s)*Act(i))/\sum_{i=t-n}^{t-1}Act(i)$$

where t indicates the current interval (calendar week number);

s indicates the shift into the future for which the WAPE should be calculated;

n indicates the number of date points (different weeks in which a forecast was calculated) that should be considered for the calculation;

APE(k,m) indicates the Absolute Percentage Error for calendar week k and date point m; and Act(k) indicates actual sales quantity (shipment data) for calendar week k.

Generated parameters, e.g., the results of the APE and or WAPE calculations, may be stored in an info cube 250 to be accessed by demand combination module 260 as part of the decision making process. As used herein, an "info cube" is a multi dimensional relational data structure.

In one embodiment, combination module 260 includes a plurality of decision trees 262. A rule engine 266 is included to evaluate the demand data using the decision trees. A particular characteristic combination is analyzed by traversing a corresponding decision tree. A decision tree is a structure that combines forecast key figures of multiple demand planning sources for a specific time interval into a single key figure for that time interval. Generally a decision tree is a set of logically connected decisions, each resulting in a true or false evaluation. These discussion points are also referred to herein as "conditions". Conditions are the nodes of the decision tree, each resulting in a true or false statement and thereby defining the decision path. A condition will either lead to a new decision requiring a true or false outcome or lead to a demand combination activity. In general, a condition compares two key figures or a key figure with a constant. Possible operators include equal to, unequal to, greater than, less than, greater than or equal to, less than or equal to. For the equal to comparison, a threshold can be defined. The following parameters can be maintained for a condition: Name (a condition can be re-used in different decision trees and for multiple nodes of one decision tree); processing horizon (numbers of the first and the last interval to be considered by the algorithm of the condition; the interval of the current week is interval number 1); cumulative horizon (in number of intervals); alert triggering (by default no alert is triggered by a condition, but alert triggering can be activated for the TRUE and/or FALSE case; the alert text gives the reason for the resulting evaluation; and threshold (for the equal to comparison).

Activities are routines that calculate quantities for one or more time interval of the resultant data set based on the multiple incoming demand plans. The decision path determines the individual activities that are processed. Activities contain algorithms to determine the resultant data set of the combined demand streams. A single activity calculates quantities (key figures) for one or multiple intervals of the resultant data set, taking the incoming forecast data streams and parameter settings as inputs. Typically the resultant data set is calculated by multiple activities that are performed in a sequence, which is determined by the decision tree path.

In one embodiment, an activity will never change the quantity for an interval in the resultant data set that has already been set by a preceding activity within the same decision tree evaluation. Each activity can be re-used in different decision trees or within the same decision tree. The parameter values of the activity can be different for the different usages.

The input for activities are key figures (e.g. key figures for baseline forecast, promotion forecast, WAPE) and parameters (e.g. processing horizon, alert triggering flag). The activity maintenance concept requires first the maintenance of the allowed input values for objects and parameters and subsequently the selection of the input values.

In one embodiment, allowed input values are maintained in an activity input data definition maintenance screen. The screen may also provide a where-used functionality that lists the activities in which a parameter is used. A typical parameter of an activity is the processing horizon that is similar to the processing horizon for conditions. If for an activity no value for the processing horizon is selected, the processing horizon of the preceding condition in the decision path is used.

In one embodiment, a decision tree is evaluated for entire key figures at a time. For example, the input for a decision tree evaluation for a specific characteristic combination could be for instance the key figures for baseline and promotion of two demand forecast sources. The result of the decision tree evaluation would be the determination the combined forecast key figure.

In one embodiment, graphical user interface GUI 274 permits visualization of the resultant key figures. In one embodiment, the resultant key figure as well as the input key figures can be viewed in the APO DP Planning Book. In one embodiment, the decision tree based on which the demand plans are combined into one key figure is stored in a data structure and can be viewed in a separate window.

Although new forecast data may be extracted into the data warehouse 220 on a daily basis for each characteristic combination, in one embodiment, for performance reasons the combination of multiple forecast key figures into one key figure is generally calculated only once a week. As mentioned above, if for a characteristic combination the incoming forecast data of a demand forecast stream significantly differs from the previously received forecast data of the same stream, the demand combination may be triggered anyway. This is signalled by setting a flag in the data warehouse 220 and storing the flag in the info cube 250.

In such an embodiment, the selection of a daily demand combination run would then consider this flag and would select only the flagged characteristic combinations. For the weekly demand combination run all characteristic combinations would be selected irrespective of the flag. Flags may be automatically reset responsive to receipt of the two incoming streams if neither stream is a threshold different from the previously received data.

The user interface 264 may be provided to permit creation and modification of the decision trees. A GUI 274 may provide a front and for user interface 264, to permit easier interaction between a user and combination module 260. After the activities of the decision tree are performed, the combined demand forecast may be released to a supply network planning (SNP) module 280.

Figure 3:
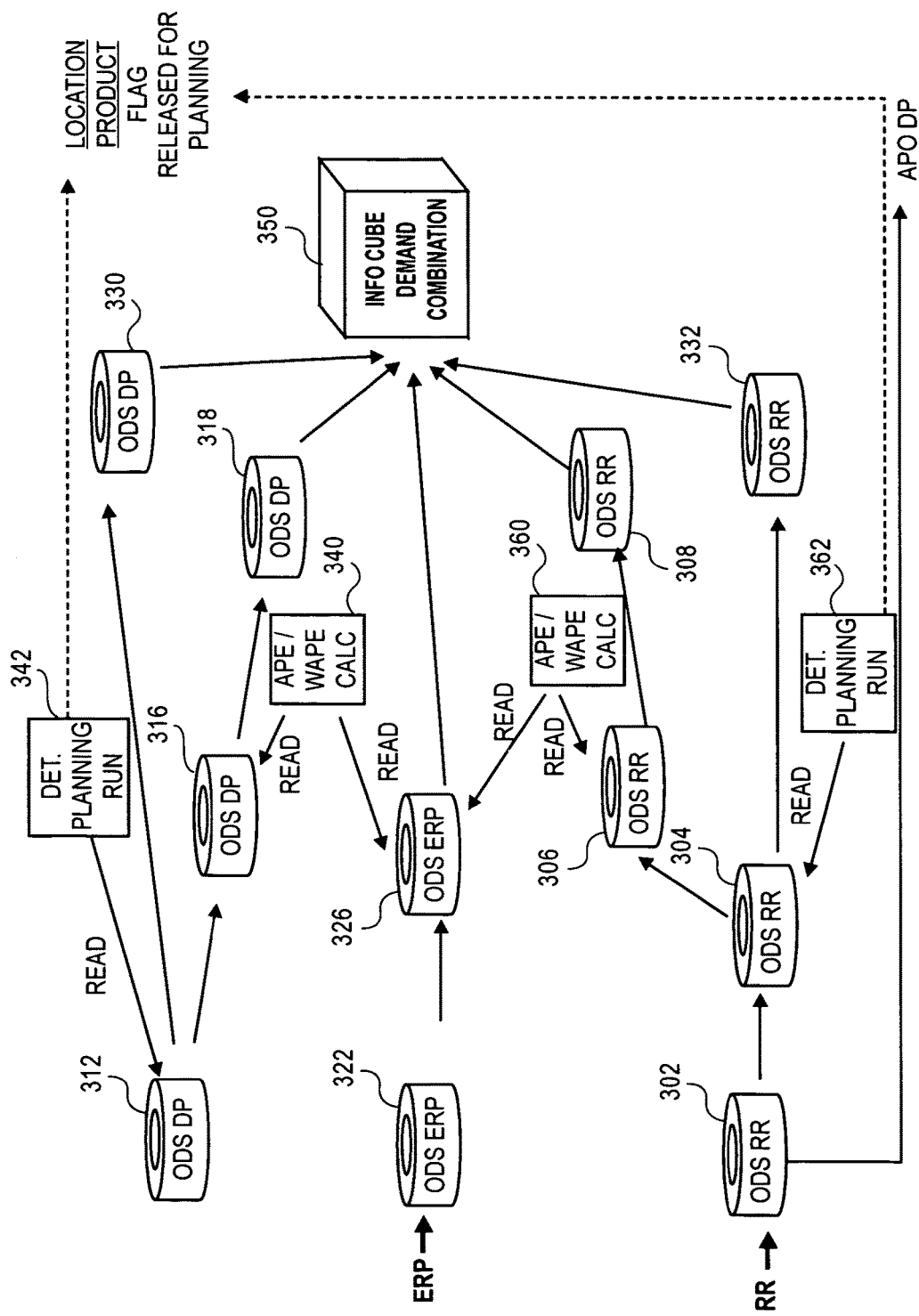
FIG. 3 is a schematic diagram of a creation of a demand combination info cube in accordance with one embodiment of the invention.

FIG. 3 is a schematic diagram of a creation of a demand combination info cube in accordance with one embodiment of the invention. In one embodiment, extractors places extracted demand data into an operational data store (ODS). An ODS is an object used to store flat relational database tables.

As previously noted, the extraction may not take place with the same frequency thus the periodicity of the data may be different. For example, RR data stored in ODS 302 may have periodicity of one day, while DP data stored in ODS 312 may have a periodicity of a week. ERP data stored in ODS 322 may also have a periodicity of one week. To arrive at the same periodicity, ODS 302 may be normalized through aggregation. ODS 304 has a periodicity of one week, the same as ODS 322 and ODS 312. In some embodiments, data extraction (or a check for new data to be extracted) may be scheduled daily. In some embodiments, normalization is scheduled with the same frequency as extraction.

Based on the forecast data contained in ODS 312 and 304 having the same periodicity, a comparison is performed to determine whether a planning run should occur in routines 342 and 362. Routine 342 compares the most recently received DP data read from ODS 312 with most recent previously received DP data. If the difference between the current and most recent previous data sets exceeds a threshold for the characteristic combination, e.g., location/product, a flag is set to indicate that a demand contribution run should occur. Analogously, routine 362 compares the most recently aggregated RR data read from ODS 304 with the previously most recent aggregated data. If the threshold is exceeded, then a characteristic combination is set to release that data stream for demand combination.

The normalized data stores having the same periodicity are replicated for error calculation as ODS 316, 326 and 306 respectively. Error calculations may be performed in connection with ODS 316 and ODS 326 with the results maintained in ODS 318 for the DP data. Similarly, error calculations 360 may be performed on ODS 306 and 326 with the resulting statistical information retained in ODS 308 for the RR data. The error calculation may include calculation of APE and WAPE. Error calculation may be scheduled with a lower frequency than extraction and normalization. For example, extraction/normalization may be scheduled daily while error calculations are scheduled once a week. ODS 312 and ODS 304 may be replicated as ODS 330 and ODS 332 as inputs to info cube 350 along with the statistical data from the error calculations in ODS 318 and ODS 308.

Figure 4:
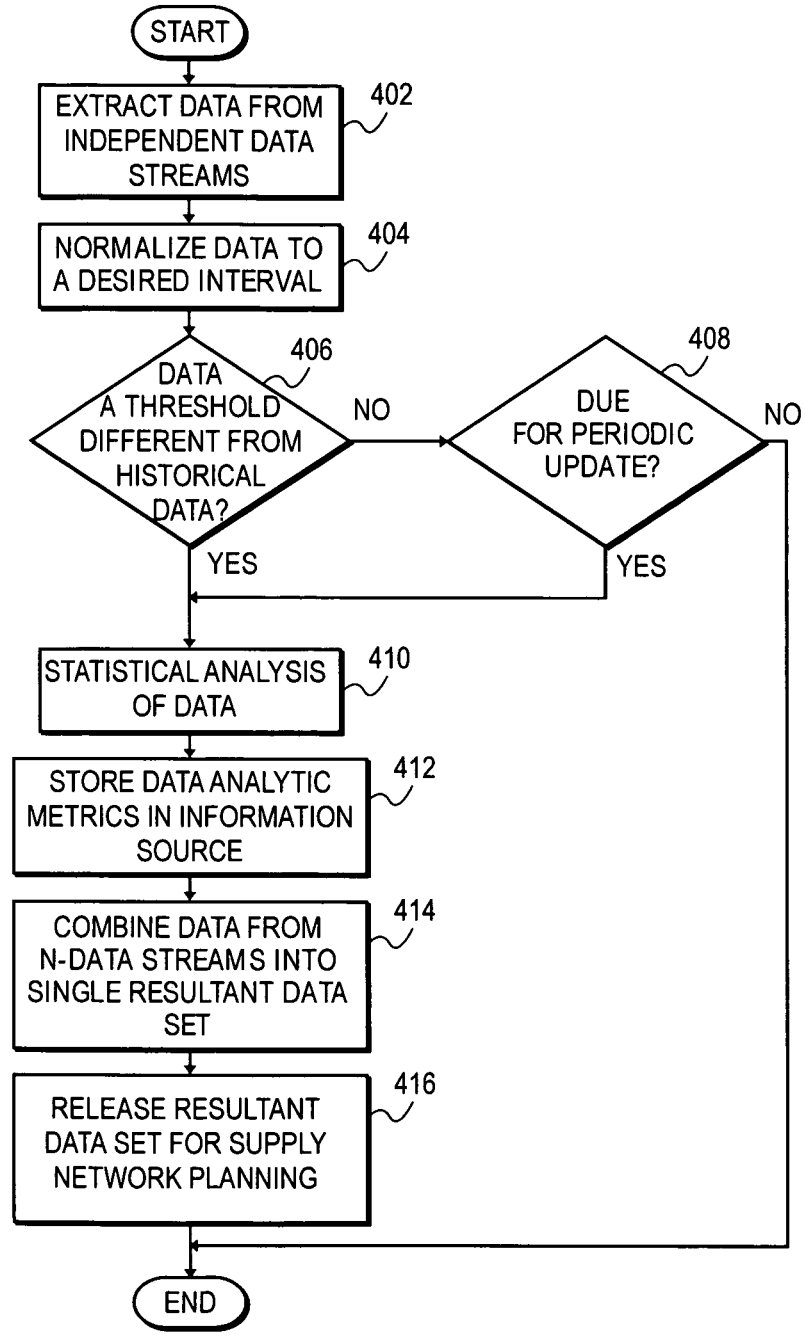
FIG. 4 is a flow diagram of an operation in one embodiment of the invention.

FIG. 4 is a flow diagram of an operation in one embodiment of the invention. At block 402, data is extracted from independent data streams. At block 404, the extracted data is normalized to correspond to a desired common time interval. At decision block 406, a determination is made if the extracted data is a threshold different from the historical data. If it is not, a determination is made at decision block 408 whether the data stream for the characteristic combination is due for a periodic update. If it is due for a periodic update, or the threshold has been exceeded at decision block 406, statistical analysis of the data is conducted at block 410. At block 412, the data and the analytic metrics are stored in an information source, such as an info cube. At block 414, the data from the data streams are combined into a single resultant data set with one key figure corresponding to each defined time interval. The resultant data set is then released for supply network planning at block 416.

Figure 5:
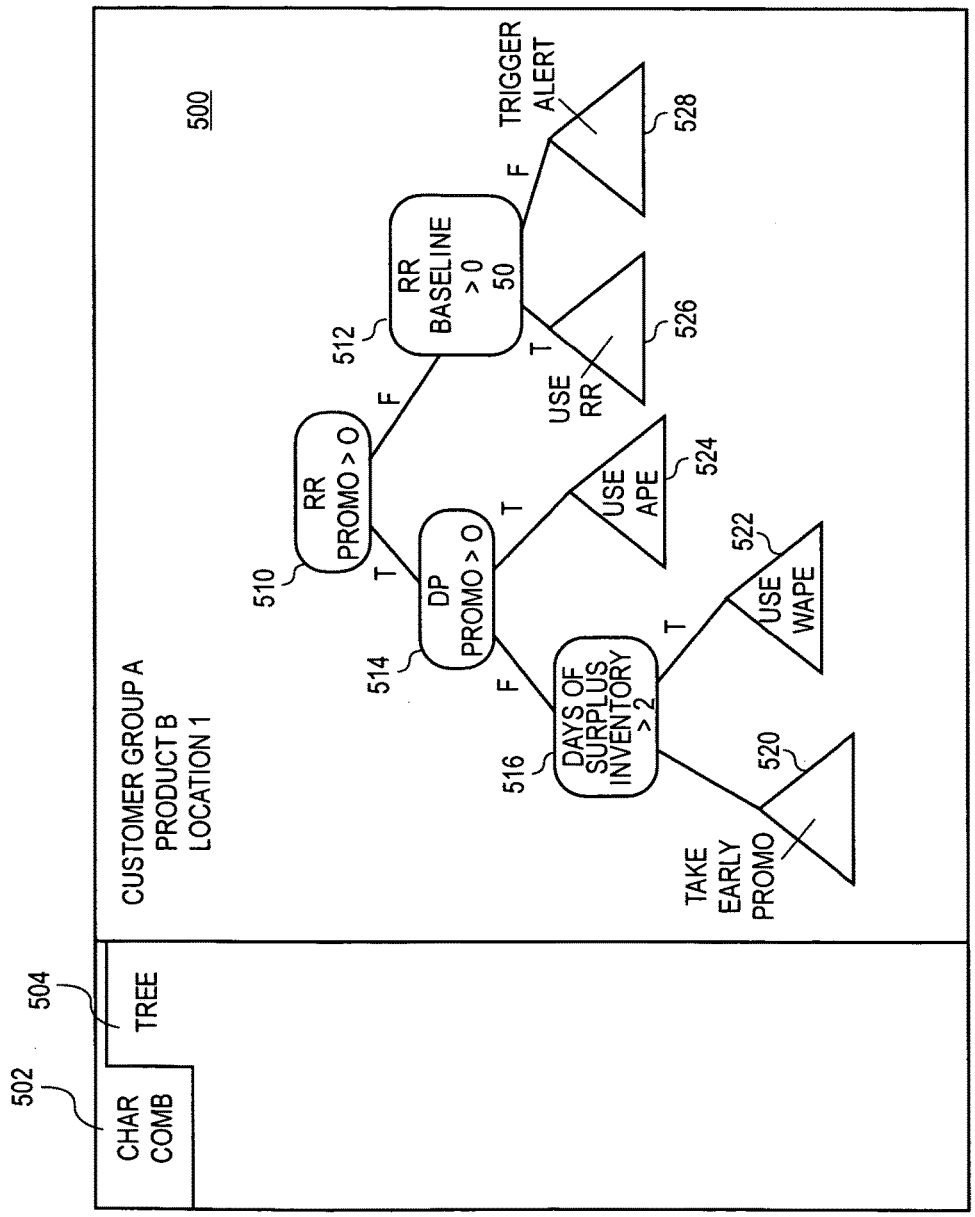
FIG. 5 is a representation of a graphical user interface (GUI) that may be associated with a system of one embodiment of the invention.

FIG. 5 is a representation of a graphical user interface (GUI) that may be associated with a system of one embodiment of the invention. In one embodiment, the GUI may have plurality of tabs, such as tab 502, which provides access to characteristic combinations and at tab 504, which provides access to decision trees. While a decision tree is evaluated relative to a particular characteristic combination, in this case, customer group A, product B and location 1, the conditions and activities of a decision tree (on even the entire tree) may be freely reused for other characteristic combinations. In this decision tree, node 510, the condition is RR promotional greater than 0. If this condition evaluates false, node 512 is reached, which evaluates the truth of RR baseline greater than 0. If RR baseline is not greater than 0, the trigger alert activity 528 is performed. If RR baseline is greater than 0, use RR activity 526 is performed. Conversely, if at node 510 the condition had evaluated to true, then condition 514 would be evaluated to determine if DP promotional is greater than 0. If node 514 evaluates to true, then use APE activity 524 would be performed. Conversely, if at node 514 the condition evaluates to false, the conditional days of surplus inventory greater than two is evaluated at node 516. If days of surplus inventory is greater than two evaluates to false, a take early promotion activity 520 is performed. Alternatively, use WAPE activity 522 would be performed.

Some of the foregoing activities are self-explanatory, e.g., use RR means that the activity will select the value from the RR data stream as the member of the resultant data set for the interval in question. A use DP activity would use the extracted DP value for the interval in question. The trigger alert activity signals a planner that manual intervention may be needed.

The WAPE activity copies the total of a baseline and a promotion key figure of a specific demand data stream into the result key figure depending on the comparison of WAPE values of the respective demand data streams. The range of intervals of this copy process can be specified in a processing horizon parameter. The algorithm operates on each interval within the processing horizon separately. For a specific interval the WAPE key figure values of the corresponding intervals of all demand data streams are compared. The corresponding interval of the result key figure is filled with the sum for the corresponding intervals of the baseline and promotion key figures of the data stream with the lowest WAPE value. If no lowest WAPE value can be determined the data source will be selected that is defined as default in the parameter. If the parameter is undefined, it will default to a default data stream, e.g., the first data stream. An analogous APE activity may also be provided.

The early promotion activity creates a combined demand stream based on promotion data. During tree evaluation, the activity accumulates promotion demand for a demand stream until a non-promotion interval is reached. The demand from the stream is compared until the same cumulative quantity is present from all sources. The first stream to reach the resulting cumulative quantity is selected to provide the resultant data for the interval(s) in question.

Various embodiments may offer various other activities. For example, some embodiments offer a decision source activity, a weight quantity activity, a large discrepancy activity, a last result activity, a stock tolerance activity, and a cumulative data activity. This is a representative list of possible activities and is not intended to be exhaustive.

The decision source activity copies the sum of multiple key figures into the resultant data set. The range of time intervals for this copy process is specified by the parameters for processing horizon. The typical usage of this activity is to select one data stream for a specific range of intervals, for instance "select RR for the first 3 intervals in the resultant data set." In this example, the selected values for the resultant data set would be the sum of baseline and promotion of the RR data stream. In one embodiment, the inputs for this activity, include baseline key figures (up to 1 per data stream), promotion key figures (up to one per data stream) and a range for evaluation parameters that specifies a first and last interval of the range to copy, also potentially on a per stream basis.

The algorithm of the activity considers all key figures that are maintained relative to the parameters, e.g., for the baseline key figures and the promotion key figure. If different ranges are assigned to different data streams, only those intervals of a key figure are considered that are within the range defined for the individual data stream. The activity will therefore assign quantities to all intervals of the result key figure that are within any of the two defined ranges, but still no activity will change the quantity of an interval in the resultant data set that has already been set by a preceding activity within the same decision tree run.

The weight quantity activity copies all key figures defined in the input parameters into the result key figure under consideration of a demand data stream specific weighting factor. The range of intervals for this copy process is specified by the processing horizon. For each data stream a weighting factor key figure can be maintained. For instance all key figures of data stream RR could be weighted with 30% and all key figures of data stream DP could be weighted with 70%. All values for intervals within the processing horizon would be filled with the weighted sum of the key figures.

The large discrepancies activity generally acts on only two different data streams. For each data stream calculate the total of the key figures. Start at the first interval of the processing horizon and generally disregard intervals for which the result key figure is already filled.

Check whether the relative difference between the values of the two total key figures is above a threshold parameter (i.e. "large discrepancy") for the interval. If it is not, fill the corresponding value for the interval of the result key figure with the value of the total key figure of the data source with the lower WAPE value and check the next interval. Continue until the first interval with large discrepancy is found. If a large discrepancy is found, then mark this interval as large discrepancy and check the relative difference of the next adjacent interval.

If the relative difference of the next adjacent interval is above the threshold parameter then mark this interval as large discrepancy. Continue until the next adjacent interval has no large discrepancy or for which the resultant key figure is already filled. Calculate the sum of all relative discrepancies for the adjacent intervals marked as large discrepancy. If this sum is above the threshold parameter then copy for the adjacent intervals marked as large discrepancy those values into the result key figure that were calculated last time the demand combination run was performed for the characteristic combination. If it is not above the threshold, copy for the adjacent intervals marked as large discrepancy the values of the total key figure of the data source that has the lower WAPE value for the first interval of the series of adjacent intervals marked as large discrepancy.

The last result activity copies those values into the resultant data set that were calculated last time the demand combination run was performed for the characteristic combination. The range of intervals for this copy process is specified by the processing horizon.

The stock tolerance activity generally considers only two different data streams. In this description, DPT=sum of the key figures of the DP data source (DP total); RRT=sum of the key figures of the RR data source (RR total); and RRE=excess inventory key figure from RR.

Starting at the first interval, go to the first interval for which the result key figure is not already filled. For the interval that is currently to be processed check, check whether DPT=0 and RRE≠0. If true, fill the resultant data set for this interval with the RRT value and continue with the next interval. If false, check the current interval for DPT=0 and RRE=0. If this is true, leave the resultant data set interval unfilled and discontinue the activity. If false, which implies DPT≠0, then for the interval currently to be processed, check whether DPT/RRT*100>100+TOLERANCE [%]. If not, leave the activity and leave the resultant data set unfilled for this interval.

If so check whether DPT/(RRT+RRE)*100>100+TOLERANCE[%]. If so, leave the activity and leave the result key figure unfilled for this interval. If not, fill the corresponding interval of the result key figure with the RRT value and start again with the next interval, but if for the next interval the result key figure is already filled leave the activity.

The cumulative delta activity also generally considers only two different data streams. Starting at the first interval of the processing horizon, go to the first interval for which the result key figure is not already filled. For the interval that is currently to be processed check whether DPT=0. If DPT=0, check if RRT=0. If not, mark this interval as out of tolerance and continue the process checking next interval for DPT=0. If RRT=0, mark the interval as in tolerance and continue with the next interval with checking for DPT=0 as above. If DPT−0, check for the interval that is currently to be processed whether Abs(DPT−RRT)/DPT*100>100+TOLERANCE_1[%]. If this inequality is false, mark this interval as in tolerance and evaluate the next interval for DPT=0 entering the process at that point above. If the inequality is true, mark this interval as out of tolerance and continue with the next interval as below. Check for the cumulative sum of all adjacent intervals marked as out of tolerance whether Sum(Abs(DPT−RRT))/Sum(DPT)*100>100+TOLERANCE_2[%]. If this evaluation is true, mark this interval as out of tolerance and repeat with the next interval. If not, mark this interval as in tolerance and return to the DPT=0 evaluation for the next interval. Continue until all intervals are marked as either out of tolerance or in tolerance.

Identify the adjacent periods (called "islands") of intervals that are marked as out of tolerance; each interval that directly succeeds such an island, marked as in tolerance, should be considered as part of the respective island. Check for all islands of adjacent out of tolerance intervals if the last interval of the island is marked as in tolerance. If yes, (the island is "complete", i.e. it is not cut by the end of the key figure) fill all intervals of the resultant data set that correspond to the island with the total key figure of the data source that shows the earlier appearance of a promotion within the island. If for both data sources the earliest promotion appears in the same interval or if there are no promotions at all within the island chose the data stream that has the larger quantity in the first interval of the island. If both are equal, then the data stream may be selected based on a priority parameter retained for the activity.

If the island is not complete, fill all intervals of the resultant key figure that correspond to the island with the total key figure of the data source that has the greater total quantity within the island. If both are equal then the data stream will default to e.g., the first data stream. Trigger an alert if the data stream that has the greater total quantity within the island has no promotion quantities within the island and if the data stream that has the smaller quantity within the island has promotion quantities within the island. Intervals of the result key figure that correspond to intervals marked as in tolerance are not filled by this activity.

In one embodiment, the GUI 500 permits the user to drag activity from the activity menu and drop them into the tree in appropriate positions. In some embodiments, a user may change conditions by selecting from a menu of previously used conditions or by creating new conditions (for which existing key figures and parameters permit evaluation). In one embodiment, the GUI 500 permits the user to click on a node of the tree to modify the condition or activity associated therewith. In one embodiment, clicking on a node causes generation of a pop up window that permits modification of the node.

Figure 6:
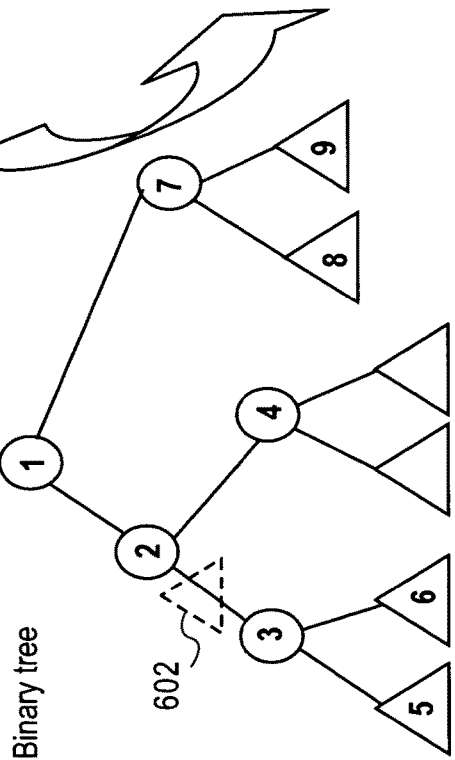
FIG. 6 is a diagram of creation of a decision tree in one embodiment of the invention.

FIG. 6 is a diagram of creation of a decision tree in one embodiment of the invention. GUI may provide a table with various cells to permit the definition of a decision tree, such is shown in FIG. 5. By entering the corresponding parameter, the operator and the value, the condition can be defined. Operator may include equality, inequality, Boolean or substantially any operator that leads to a binary evaluation. While this tree shows relatively simple conditions, complex Boolean conditions may also be created and used in some embodiments of the invention. In some embodiments, substantially any binary conditions may be represented and used in a decision tree. Horizon and cumulative horizon are also defined as part of the condition. Because the data streams by their nature are time series, it is necessary to define a horizon for analysis. In some embodiments, more than one activity may be performed along one branch of the discussion tree. For example, activity 602 may be performed between nodes 2 and 3 of the tree, while activity 5 or 6 will be performed after evaluation of the condition at node 3.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   extracting, in a computer, first demand data from a first forecast demand data stream, wherein the first demand data stream is of a first type;
   extracting, in the computer, second demand data from a second forecast demand data stream, wherein the second demand data stream is of a second type different from the first type and wherein both demand data streams apply to a same source of demand;
   storing the extracted first demand data and the extracted second demand data in a database of a data warehouse;
   at the computer, computing and storing parameters associated with an error measurement for the first demand data and for the second demand data at a demand combination info cube;
   determining correspondingly, by the computer, frequencies of data extraction for demand data combination from first demand data and second demand data;
   combining, in the computer, the first demand data and the second demand data based on at least one criteria associated with the stored parameters, to generate the demand combination info cube, wherein generating the demand combination info cube includes combining the first and second demand data based on:
   evaluating, by a rule engine, characteristics combinations of the first demand data and the second demand data by traversing conditions defined at nodes of a decision tree, wherein the conditions are associated with comparisons of forecast key figures defined in the first and second demand data for a time interval;
   calculating a resultant demand data set based on performing a sequence of demand combination activities, wherein the sequence of demand combination activities is determined during traversing the decision tree, and wherein the resultant demand data set is to be stored at the demand combination info cube;
   determining modified frequencies of data extraction based on the sequence of demand combination activities; and
   performing a modification, by the computer, of the frequencies of data extraction from the first demand data and the second demand data, based on the calculated resultant demand data set; and
   releasing the demand combination info cube for supply network planning.

2. The method of claim 1 wherein combining comprises:
   calculating the parameters to include error measurement statistics for the first and the second demand data; and selecting demand data from the demand data having a least error as part of the resultant demand data set.

3. The method of claim 2 wherein calculating comprises:
determining one of absolute percentage error (APE) and weighted absolute percentage error (WAPE).

4. The method of claim 1 wherein combining comprises:
applying a first weighting factor to the first demand data to obtain a first weighted demand data;
applying a second weighting factor to the second demand data to obtain a second weighted demand data; and
summing the first weighted demand data with the second weighted demand data.

5. The method of claim 1 further comprising:
normalizing the first and second demand data to correspond to the time interval.

6. The method of claim 1 further comprising:
comparing one of the first demand data and the second demand to previous demand data from a corresponding one of the first forecast demand data stream and the second forecast demand data stream; and
updating the combining if the comparing shows a difference exceeding a threshold.

7. The method of claim 1 wherein traversing comprises:
evaluating one or more binary conditions from the conditions defined in the decision tree to identify an activity part of the sequence of demand combination activities; and
performing the activity to generate a member of the resultant demand data set.

8. A system comprising:
a processor;
a first extractor to extract first demand data from a first forecast demand data stream, the first demand data stream being of a first type;
a second extractor to extract second demand data from a second forecast demand data stream, the second demand data stream being of a second type different from the first type;
a database of a data warehouse to retain historical demand data and the extracted first demand data and the extracted second demand data;
at the data warehouse, compute and store parameters associated with error measurement for the first demand data and the second demand data at a demand combination info cube;
determine correspondingly, by the computer, frequencies of data extraction for demand data combination from first demand data and second demand data; and
a combination module to combine the first and second demand data into a single resultant data set and to generate the demand combination info cube, wherein determining the single resultant data set is based, at least in part, on evaluations associated with the historical demand data,
and wherein both demand data streams apply to a same source of demand,
and wherein to determining the demand combination info cube includes combining the first and the second demand data based on instructions to:
evaluate, by a rule engine, characteristics combinations of the first and the second demand data by traversing conditions defined at nodes of a decision tree, wherein the conditions are associated with comparisons of forecast key figures defined in the first and second demand data for a time interval;
calculate the single resultant demand data set based on performing a sequence of demand combination activities, wherein the sequence of demand combination activities is determined during traversing the decision tree; and
determine modified frequencies of data extraction based on the sequence of demand combination activities; and
perform a modification, by the computer, of the frequencies of data extraction from the first demand data and the second demand data, based on the calculated resultant demand data set.

9. The system of claim 8 further comprising:
a demand planning module to provide the first forecast demand data stream; and
a responsive replenishment module to provide the second forecast demand data stream.

10. The system of claim 8 further comprising an analysis module, wherein the analysis module comprises:
the rule engine to evaluate the first and the second demand data against the conditions defined in the nodes of the decision tree.

11. The system of claim 10 further comprising:
a graphical user interface to permit modification of the set of rules.

12. The system of claim 10 wherein the analysis module comprises:
an error calculation component.

13. A non-transitory machine-accessible medium containing instructions that when executed cause a machine to:
extract first demand data from a first forecast demand data stream, wherein the first demand data stream is of a first type;
extract second demand data from a second forecast demand data stream, wherein the second demand data stream is of a second type different from the first type and wherein both demand data streams apply to a same source of demand;
store the extracted first demand data and the second demand data in a database of a data warehouse;
at the data warehouse, compute and store parameters associated with error measurement for the first demand data and the second demand data at a demand combination info cube;
determine correspondingly, by the computer, frequencies of data extraction for demand data combination from first demand data and second demand data;
combine the first and second demand data based on at least one criteria associated with the stored parameters to generate the demand combination info cube, wherein the instructions to determine the demand combination info cube include instructions to combine the first and second demand data based on:
evaluate, by a rule engine, characteristics combinations of the first and the second demand data by traversing conditions defined at nodes of a decision tree, wherein the conditions are associated with comparisons of forecast key figures defined in the first and second demand data for a time interval;
calculate a resultant demand data set based on performing a sequence of demand combination activities, wherein the sequence of demand combination activities is determined during traversing the decision tree, and wherein the resultant demand data set is to be stored at the demand combination info cube;
determining modified frequencies of data extraction based on the sequence of demand combination activities; and
performing a modification, by the computer, of the frequencies of data extraction from the first demand data and the second demand data, based on the calculated resultant demand data set; and release the demand combination info cube for supply network planning.

14. The machine accessible medium of claim 13, wherein instructions causing the machine to combine, cause the machine to:

calculate the parameters to include error measurement statistics for the first and the second forecast demand data stream; and select the demand data from the forecast demand data stream having a least error as part of the resultant demand data set.

15. The machine accessible medium of claim 14 wherein instructions causing the machine to calculate, cause the machine to:

determine one of absolute percentage error (APE) and weighted absolute percentage error (WAPE).

16. The machine accessible medium of claim 13, wherein instructions causing the machine to combine, cause the machine to:

apply a first weighting factor to the first demand data to obtain a first weighted demand data;

apply a second weighting factor to the second demand data to obtain a second weighted data; and summarize the first weighted demand data with the second weighted demand data.

17. The machine accessible medium of claim 13, wherein instructions further cause the machine to:

normalize the first and second demand data to correspond to the time interval.

18. The machine accessible medium of claim 13, wherein instructions further cause the machine to:

compare one of the first demand data and the second demand to previous demand data from a corresponding one the first forecast demand data stream and the second forecast demand data stream; and update the combining if the comparing shows a difference exceeding a threshold.

19. The machine accessible medium of claim 13, wherein instructions causing the machine to traverse cause the machine to:

evaluate one or more binary conditions from the conditions defined in the decision tree to identify an activity part of the sequence of demand combination activities; and perform the activity to generate a member of the resultant data set.

* * * * *